(12) United States Patent
Bill et al.

(10) Patent No.: US 12,269,303 B2
(45) Date of Patent: Apr. 8, 2025

(54) PREDICTING TIRE PRESSURE OF A TIRE OF AN AIRCRAFT

(71) Applicant: AIRBUS OPERATIONS LIMITED, Bristol (GB)

(72) Inventors: Andrew Bill, Bristol (GB); Michael Orford, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 266 days.

(21) Appl. No.: 18/098,424

(22) Filed: Jan. 18, 2023

(65) Prior Publication Data

US 2023/0226859 A1 Jul. 20, 2023

(30) Foreign Application Priority Data

Jan. 19, 2022 (GB) ..................................... 2200651

(51) Int. Cl.
*B60C 23/04* (2006.01)
(52) U.S. Cl.
CPC ................................ *B60C 23/0476* (2013.01)
(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/0462; B60C 23/20; B60C 23/041; B60C 23/0411; B60C 23/0479; B60C 23/0444; B60C 11/246; B60C 23/064; B60C 23/0488; B60C 11/24; B60C 23/007; B60C 23/062;
(Continued)

(56) References Cited

U.S. PATENT DOCUMENTS

| 7,240,542 B2 * | 7/2007 | Gustafsson ........... B60T 8/1725 |
| | | 73/146 |
| 11,667,162 B2 * | 6/2023 | Puntambekar ...... B60C 23/0477 |
| | | 73/146 |

(Continued)

FOREIGN PATENT DOCUMENTS

| DE | 102004040756 A1 * | 8/2005 | ......... B60C 23/0408 |
| EP | 2 871 079 | 5/2015 | |

(Continued)

OTHER PUBLICATIONS

Combined Search and Examination Report for GB2200651.4, 6 pages, dated May 23, 2022.

(Continued)

*Primary Examiner* — Andre J Allen
(74) *Attorney, Agent, or Firm* — Nixon & Vanderhye P.C.

(57) ABSTRACT

A computer-implemented method of predicting tire pressure of a tire of an aircraft, the method including obtaining first data indicative of an inflation pressure of the tire, obtaining second data indicative of a brake temperature of a brake associated with an aircraft wheel to which the tire is mounted, obtaining third data indicative of a gas temperature of the tire, and obtaining fourth data indicative of one or more predicted operational conditions of the aircraft during a future time period. The method includes determining, based at least in part on the first, second, third and fourth data, predicted tire pressure characteristics of the tire during the future time period.

20 Claims, 4 Drawing Sheets

(58) Field of Classification Search
CPC . B60C 23/0401; B60C 23/0413; B60C 23/06; B60C 23/043; B60C 23/0452; B60C 23/0498; B60C 23/02; B60C 23/0467; B60C 99/006; B60C 2019/004; B60C 23/0428; B60C 23/0442; B60C 11/243; B60C 23/009; B60C 23/0425; B60C 23/00354; B60C 23/004; B60C 23/045; B60C 23/0464; B60C 23/04985; B60C 23/003; B60C 23/00318; B60C 23/0403; B60C 23/0406; B60C 23/0472; B60C 23/066; B60C 23/00; B60C 23/00372; B60C 29/02; B60C 23/006; B60C 11/00; B60C 23/0454; B60C 23/044; B60C 23/0455; B60C 23/008; B60C 23/0483; B60C 25/002; B60C 23/0461; B60C 23/0474; B60C 23/0489; B60C 23/0491; B60C 29/064; B60C 23/0415; B60C 23/00363; B60C 23/0459; B60C 23/0471; B60C 23/0481; B60C 23/0476; B60C 11/0318; B60C 23/0477; B60C 2200/02; B60C 23/002; B60C 23/0437; B60C 2019/005; B60C 23/042; B60C 23/0405; B60C 23/0422; B60C 23/0423; B60C 23/0466; B60C 13/001; B60C 29/06; B60C 23/0447; B60C 25/132; B60C 23/0427; B60C 23/0449; B60C 9/18; B60C 25/00; B60C 23/065; B60C 23/0484; B60C 23/0486; B60C 19/003; B60C 13/00; B60C 23/00336; B60C 23/00345; B60C 23/08; B60C 17/00; B60C 2019/006; B60C 23/001; B60C 25/142; B60C 5/004; B60C 17/02; B60C 23/0445; B60C 23/0457; B60C 29/00; B60C 11/0083; B60C 25/145; B60C 9/02; B60C 11/0332; B60C 25/18; B60C 29/066; B60C 11/13; B60C 23/0418; B60C 23/0469; B60C 23/068; B60C 23/12; B60C 99/00; B60C 23/0432; B60C 25/138; B60C 5/14; B60C 11/03; B60C 23/005; B60C 25/005; B60C 25/007; B60C 25/0554; B60C 3/00; B60C 11/11; B60C 17/04; B60C 17/06; B60C 23/0435; B60C 23/063; B60C 23/10; B60C 25/14; B60C 29/005; B60C 29/062; B60C 99/003; B60C 11/032; B60C 11/12; B60C 13/003; B60C 15/06; B60C 19/001; B60C 23/126; B60C 23/127; B60C 23/16; B60C 29/068; B60C 3/04; B60C 9/20; B60C 11/01; B60C 11/0302; B60C 13/02; B60C 25/056; B60C 29/04; B60C 5/142; B60C 1/0016; B60C 11/0304; B60C 11/0306; B60C 19/08; B60C 2009/2038; B60C 2011/0374; B60C 2011/0388; B60C 2011/1213; B60C 2011/1231; B60C 2011/1245; B60C 2200/04; B60C 2200/065; B60C 23/00305; B60C 23/067; B60C 23/131; B60C 23/135; B60C 23/137; B60C 23/18; B60C 25/02; B60C 11/02; B60C 17/0009; B60C 19/002; B60C 19/12; B60C 2019/007; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/12; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 2200/00; B60C 23/085; B60C 25/0548; B60C 25/185; B60C 7/105; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/326; G01M 1/02; G01M 1/30; G01M 17/0074; G01M 5/0058; G01M 1/26; G01M 17/04; G01M 1/225; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 3/40; G01M 1/04; G01M 17/08; G01M 17/03; G01M 5/0091; G01M 1/365; G01M 13/04; G01M 5/0066; G01M 1/08; G01M 1/22; G01M 13/027; G01M 5/0033; G01M 1/00; G01M 15/044; G01M 17/00; G01M 3/24; G01M 3/2876; G01M 5/0075; G01M 1/06; G01M 1/12; G01M 1/122; G01M 1/24; G01M 1/32; G01M 1/36; G01M 11/081; G01M 13/023; G01M 13/025; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 1/14; G01M 1/28; G01M 3/002; G01M 3/04; G01M 7/02; G01M 9/06

USPC .................................................. 73/146–146.8

See application file for complete search history.

(56) References Cited

U.S. PATENT DOCUMENTS

| | | | | |
|---|---|---|---|---|
| 11,772,434 | B2* | 10/2023 | Bill | .................... G01L 17/00 702/50 |
| 11,845,540 | B2* | 12/2023 | Robertson | ........... B60C 23/0476 |
| 12,115,819 | B2* | 10/2024 | Bill | ................ B60C 23/0476 |

(56) References Cited

U.S. PATENT DOCUMENTS

2015/0224831 A1    8/2015   Miller
2019/0378353 A1   12/2019   Mylaraswamy et al.

FOREIGN PATENT DOCUMENTS

| EP | 3 069 904 | | 9/2016 |
| EP | 3 929 006 | | 12/2021 |
| JP | 2024512293 A | * | 3/2024 |

OTHER PUBLICATIONS

European Search Report cited in EP 23152259.0 mailed May 10, 2023, 7 pages.

* cited by examiner

PREDICTING TIRE PRESSURE OF A TIRE OF AN AIRCRAFT

RELATED APPLICATION

This application incorporates by reference and claims priority to United Kingdom patent application GB 2200651.4, filed Jan. 19, 2022.

TECHNICAL FIELD

The present invention relates to a computer-implemented method of predicting tire pressure of a tire of an aircraft.

BACKGROUND

Checking tire pressure is an important part of the maintenance of a vehicle. Tire pressures should be maintained at predetermined pressures to ensure that a tire performs as intended by the manufacturer.

SUMMARY

A first aspect of the present invention provides a computer-implemented method of predicting tire pressure of a tire of an aircraft, the method comprising: obtaining first data indicative of an inflation pressure of the tire; obtaining second data indicative of a brake temperature of a brake associated with an aircraft wheel to which the tire is mounted; obtaining third data indicative of a gas temperature of the tire; obtaining fourth data indicative of one or more predicted operational conditions of the aircraft during a future time period; and determining, based at least in part on the first, second, third and fourth data, predicted tire pressure characteristics of the tire during the future time period.

Optionally, the fourth data is indicative of one or more of: a predicted future route of the aircraft within the future time period; a predicted turn-around time of the aircraft between future flight cycles within the future time period; a predicted flight time of one or more flight cycles of the aircraft within the future time period; a predicted ground time of the aircraft within the future time period; a predicted weight of the aircraft during one or more flight cycles of the aircraft within the future time period; a time of day during which the aircraft is predicted to be in-flight and/or on ground within the future time period; a predicted aircraft taxi distance within the future time period; and a predicted number of flight cycles of the aircraft within the future time period.

Optionally, wherein the fourth data is indicative of one or more of: a predicted runway surface condition for one or more runways on which the aircraft is predicted to operate within the future time period; a predicted weather forecast for an ambient environment of the aircraft at predicted geographic locations within the future time period;

Optionally, the fourth data is indicative of one or more of: a predicted inflation pressure of the tire within the future time period; a predicted brake temperature of the brake within the future time period; a predicted gas temperature of the tire within the future time period; a predicted tire carcass temperature of the tire within the future time period; a predicted pressure loss of the tire within the future time period; a predicted aircraft wheel temperature of the aircraft wheel within the future time period; a predicted usage of a brake cooling fan associated with the brake within the future time period; a predicted brake wear state of the brake within the future time period; a predicted ambient temperature within the future time period; a predicted aircraft position within the future time period; a predicted aircraft steering angle during one or more flight cycles within the future time period; a predicted aircraft speed during one or more flight cycles within the future time period; a predicted aircraft centre of gravity during one or more flight cycles within the future time period; and a predicted braking energy of the brake during one or more flight cycles within the future time period.

Optionally, the first data is indicative of one or more of a past inflation pressure of the tire, and a current inflation pressure of the tire.

Optionally, the second data is indicative of one or more of a past brake temperature of the brake and a current brake temperature of the brake.

Optionally, the third data is indicative of one or more of a past gas temperature of the tire and a current gas temperature of the tire.

Optionally, the method comprises determining, based at least in part on the predicted tire pressure characteristics of the tire, a maintenance action to be performed on the tire.

Optionally, the method comprises scheduling, based at least in part on the predicted tire pressure characteristics of the tire, a maintenance action to be performed on the tire.

Optionally, the method comprises updating the predicted tire pressure characteristics based at least in part on actual operational conditions of the aircraft experienced within at least part of the future time period.

Optionally, the future time period is at least 3 days, at least 5 days, or at least 10 days.

Optionally, the method comprises determining, based at least in part on the predicted tire pressure characteristics of the tire, a predicted remaining lifespan of the tire.

Optionally, the method comprises determining, based at least in part on the predicted tire pressure characteristics of the tire, a future inflation pressure for the tire.

Optionally, determining the predicted tire pressure characteristics of the tire during the future time period comprises utilising a model of the tire, and the brake, and one or more relationships between the tire and the brake.

Optionally, determining the predicted tire pressure characteristics of the tire during the future time period comprises utilising a machine learning algorithm.

Optionally, the method comprises obtaining fifth data indicative of historical tire condition, and determining, based at least in part on the first, second, third, fourth, and fifth data, the predicted tire pressure characteristics of the tire.

Optionally, the method comprises obtaining sixth data indicative of historical wheel condition, and determining, based at least in part on the sixth data, the predicted tire pressure characteristics of the tire.

Optionally, the method comprises displaying the predicted tire pressure characteristics of the tire to a user.

A second aspect of the present invention provides a computing system comprising one or more processors configured to perform the computer-implemented method according to the first aspect of the present invention.

A third aspect of the present invention provides a data carrier comprising machine readable instructions for the operation of one or more processors of the computing system according to the second aspect of the present invention to perform the computer-implemented method according to the first aspect of the present invention.

A fourth aspect of the present invention provides a method of predicting a pressure of a tire, the method comprising: obtaining historical tire inflation pressure data of the tire; obtaining historical brake temperature data of a brake configured to provide a braking force to a wheel associated with tire; obtaining historical gas temperature data of the tire; obtaining future aircraft operating data; and determining, based at least in part on the historical tire inflation pressure data, the historical brake temperature data, the historical gas temperature data and the future aircraft operating data, a future tire pressure of the tire.

BRIEF DESCRIPTION OF THE DRAWINGS

Embodiments of the invention will now be described, by way of example only, with reference to the accompanying drawings, in which.

DETAILED DESCRIPTION

Figure 1:
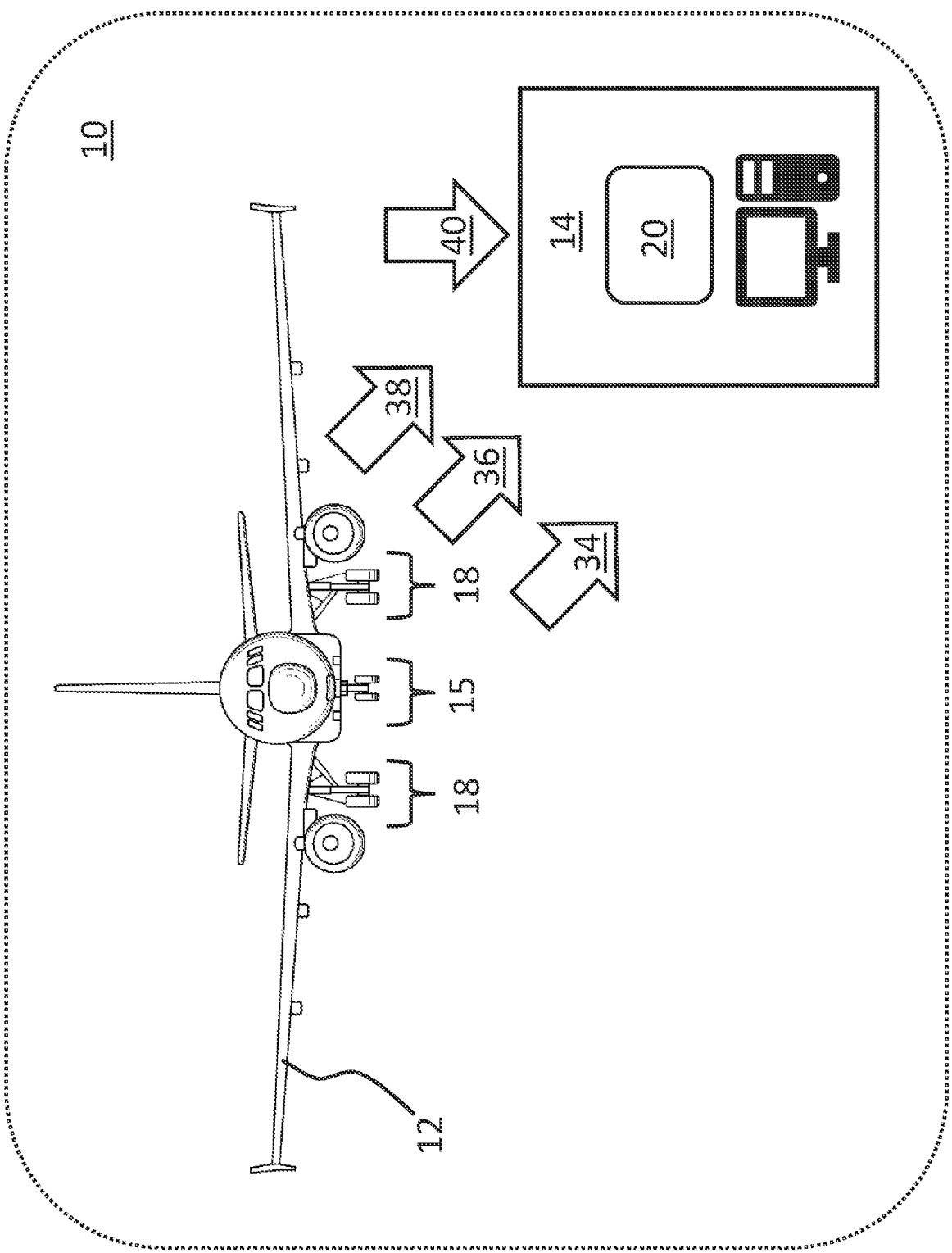
FIG. 1 shows a schematic illustration of a system comprising an aircraft and a computing system.

A system 10 comprising an aircraft 12 and a computing system 14 is illustrated schematically in FIG. 1. The aircraft 12 comprises a first group 15 of two nose wheels, and a second group 18 of four main landing gear wheels. It will be appreciated that the number of wheels may vary between aircraft in practice. The computing system 14 comprises one or more processors 20 that are configured to operate in a manner described in more detail hereafter. The computing system 14 can be located on-board the aircraft 12, and/or located remotely from the aircraft 12.

Figure 2:
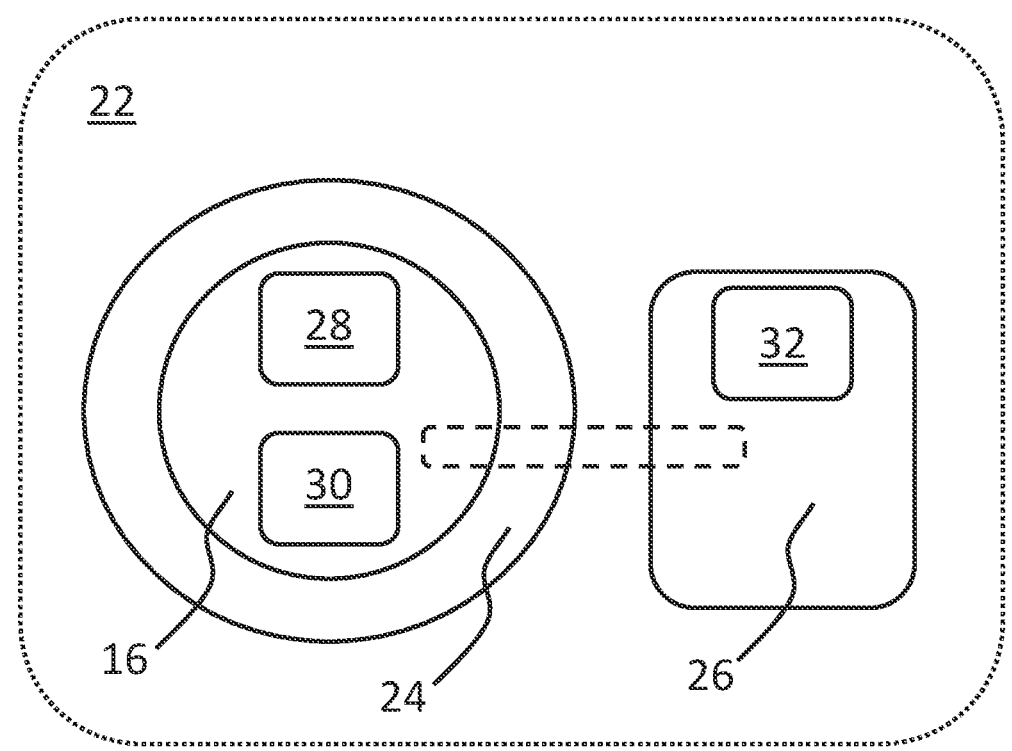
FIG. 2 shows a schematic illustration of a wheel system of the aircraft of FIG. 1.

A wheel system 22 associated with an individual wheel 16, such as a nose wheel or a main landing gear wheel, is illustrated schematically in FIG. 2. The system 22 comprises a tire 24, a brake 26, a tire pressure sensor 28, a tire temperature sensor 30, and a brake temperature sensor 32.

The computing system 14 is configured to obtain first data 34 indicative of an inflation pressure of the tire 24 from the tire pressure sensor 28, for example a pressure to which the tire 24 was last inflated.

The computing system 14 is configured to obtain second data 36 indicative of a brake temperature of the brake 26 from the brake temperature sensor 32, for example a brake temperature of the brake 26 following application of the brake 26 during landing of the aircraft 12 or during taxi of the aircraft 12. The brake temperature may, in practice, be dependent on other factors such as wheel speed, brake pressure, brake torque, brake gain, brake wear state, reverse thrust, aerodynamic drag, and the like, and it will be appreciated that in some examples the brake temperature can be inferred from such parameters, rather than being directly measured by the brake temperature sensor 32. It will be appreciated that the brake temperature can impact the tire gas temperature through its proximity to the tire.

The computing system 14 is configured to obtain third data 38 indicative of a gas temperature of the tire 24 from the tire temperature sensor 30. The tire temperature sensor 30 may in practice indirectly measure the gas temperature of the tire 24, for example by measuring the temperature of a wheel component located internally within the tire 24 and inferring the gas temperature using appropriate mathematical relationships. For example, as the gas temperature of the tire 24 changes, so will the gas pressure of the tire 24.

Although gas loss due to diffusion/leakage may be constantly occurring, we can assume over a relatively short period of time that the effect of pressure loss is nominal and that the relationship between pressure and temperature follows the ideal gas law. The ideal gas law can be given as $PV=nRT$, where P is pressure, V is volume, n is amount of gas, R is the ideal gas constant, and T is temperature. For example, the ideal gas law can be used to map a measured temperature of a wheel component to a gas temperature through knowledge of the tire gas pressure at that measured temperature.

Details of the form of the tire pressure sensor 28, the brake temperature sensor 32, and the tire temperature sensor 30, are not pertinent to the present invention, and so are not described here for the sake of brevity. It will be appreciated, however, that any appropriate tire pressure sensor, brake temperature sensor, and tire temperature sensor, can be utilised by a person skilled in the art. Although the sensors 28, 30 and 32 are depicted separately for clarity, some or all of them may be combined into a single element in some examples, for example a combined tire pressure and tire temperature sensor may be provided.

It will further be appreciated that although the first 34, second 36 and third 38 data are described here as being obtained directly from the corresponding sensors, in other examples the first 34, second 36 and third 38 data can be obtained indirectly by the computing system 14, for example by inference from other parameters without the use of the respective sensor, and/or by obtaining an appropriate value stored in memory or the like. In some examples the first 34, second 36 and third 38 data can be obtained by the computing system 14 in real-time, for example such that the first 34, second 36 and third 38 data are indicative of current inflation pressure, current brake temperature and current tire gas temperature, respectively. In some examples, first 34, second 36 and third 38 data can comprise historical data, for example data indicative of past inflation pressure, past brake temperature, and past tire gas temperature, respectively.

The computing system 14 is further configured to obtain fourth data 40 indicative of one or more predicted operational conditions of the aircraft 12 during a future time period. The form of the fourth data 40 can vary in practice, with illustrative examples discussed later herein.

The computing system 14 is configured to determine, based at least in part on the first 34, second 36, third 38 and fourth 40 data, predicted tire pressure characteristics of the tire 24 during the future time period. Such determination may take place via appropriate processing of the first 34, second 36, third 38 and fourth 40 data by the one or more processors 20 of the computing system 14. The processing can take many forms.

In some examples, processing of the first 34, second 36, third 38 and fourth 40 data may utilise a pre-determined model of the wheel system 22, for example a model of the tire 24, brake 26, and the relationships between them, for example with respect to pressure and/or temperature. In other examples, processing of the first 34, second 36, third 38 and fourth 40 data may utilise a machine learning algorithm having the first 34, second 36, third 38 and fourth 40 data as inputs, and the predicted tire pressure characteristics of the tire 24 during the future time period as an output. Such a machine learning algorithm may be trained to provide its output based on a set of training data, for example a set of training data labelled with ground truth values in a supervised learning process. In another example, measured data may form a training data set—for example a pressure at time $t_1$ can be used as the ground truth and the data at time $t_2$ forms training data, where $t_2$ is a time a predetermined period before $t_1$, such as 1 hour, 2 hours, 3 hours, 4 hours, 5 hours, 6 hours, 12 hours, 24 hours, 2 days, 3 days, 4 days, 5 days, 7 days, 10 days, 14 days, 1 month, 2 months, and so on. A same measured data set can be used as training data across different time periods and some examples may comprise machine learning algorithms for respective different time periods. In some examples, the machine learning algorithm can be updated in real-time based on data obtained by the aircraft 12. In some examples the machine learning algorithm can comprise a neural network.

Figure 3:
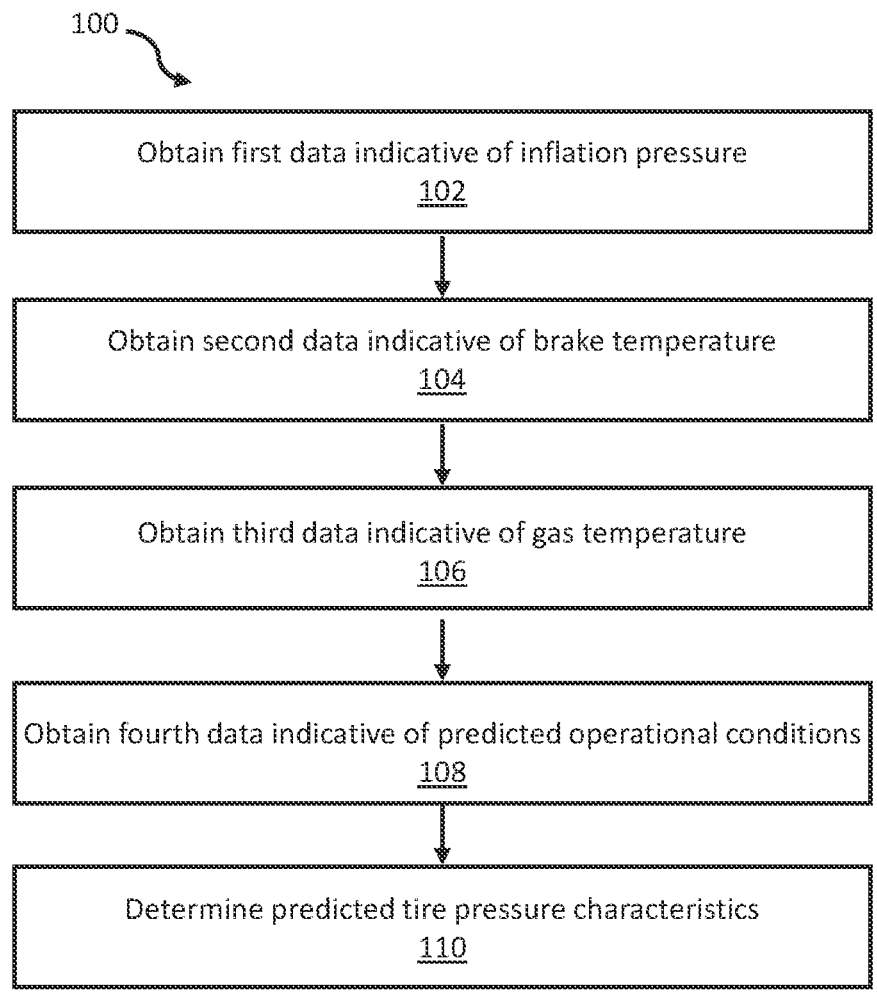
FIG. 3 shows a method in accordance with the system of FIG. 1.

A method 100 in accordance with the system 10 is illustrated schematically in FIG. 3.

The method 100 comprises obtaining 102 first data indicative of an inflation pressure of the tire.

The method 100 comprises obtaining 104 second data indicative of a brake temperature of a brake associated with an aircraft wheel to which the tire is mounted.

The method 100 comprises obtaining 106 third data indicative of a gas temperature of the tire.

The method 100 comprises obtaining 108 fourth data indicative of one or more predicted operational conditions of the aircraft during a future time period.

The method 100 comprises determining 110, based at least in part on the first, second, third and fourth data, predicted tire pressure characteristics of the tire during the future time period.

Once the computing system 14 has determined the predicted tire pressure characteristics of the tire 24, a plurality of actions may be taken by the computing system 14. In some examples the computing system 14 can determine based at least in part on the predicted tire pressure characteristics of the tire 24, a maintenance action to be performed on the tire. In some examples the computing system 14 can schedule, based at least in part on the predicted tire pressure characteristics of the tire 24, a maintenance action to be performed on the tire 24. In some examples, a determined and/or scheduled maintenance action can be displayed to a user by the computing system 14. By utilising the computing system 14 in such a manner, actions such as future required inflation of the tire 24 can be predicted. This may allow for longer maintenance free operating periods for the aircraft 12, for example in comparison to existing systems where tire pressures are required to be checked more regularly. For example, the future time period can be at least 3 days, at least 5 days, or at least 10 days, which may enable a corresponding maintenance free operating period for the aircraft 12. This may also allow for improved planning of routes of the aircraft 12, for example by enabling routes to be planned to guide the aircraft 12 to an appropriate maintenance center when required. Prediction of the tire pressure characteristics of the tire 24 may also facilitate reduction of aircraft turn-around time, for example by reducing or eliminating the need to wait for tires to cool for a direct pressure measurement to be made.

In some examples the computing system 14 is configured to utilise the predicted tire pressure characteristics of the tire 24 to determine a remaining lifespan of the tire 24. For example the computing system 14 can utilise data relating to any of tire deflection, tire rolling distances, number of flight cycles, brake energy, brake temperature, wheel temperature, tire gas temperature, tire carcass temperature, and the predicted tire pressure characteristics of the tire 24 to determine a remaining lifespan of the tire 24.

In some examples the predicted tire pressure characteristics can be updated by the computing system 14 based at least in part on actual operational conditions of the aircraft 12 experienced within at least part of the future time period. In such a manner accuracy of the predicted tire pressure characteristics for the remainder of the future time period may be improved.

As noted above, the fourth data 40 can take a plurality of forms.

In some examples, the fourth data 40 is indicative of one or more of: a predicted runway surface condition for one or more runways on which the aircraft is predicted to operate within the future time period; and a predicted weather forecast for an ambient environment of the aircraft at predicted geographic locations within the future time period.

Runway surface conditions and/or weather conditions can impact on the length of time the brake 26 is required to be applied to bring the aircraft 12 to a stop on a runway. For example, where a runway is contaminated by rain, snow, or ice, an increased amount of braking, e.g. an increased brake application time, may be required to bring the aircraft 12 to a stop. This can impact on the temperature of the brake 26, which can in turn impact on the predicted tire pressure characteristics of the tire 24.

Similarly, where runway surface friction effects result in a low coefficient of friction between the runway and the tire 24, an increased amount of braking, e.g. an increased brake application time, may be required to bring the aircraft 12 to a stop. This can impact on the temperature of the brake 26, which can in turn impact on the predicted tire pressure characteristics of the tire 24. Similarly, where runway surface friction effects result in a high coefficient of friction between the runway and the tire 24, the tire 24 itself, e.g. the tire carcass, may experience increased heating, which can impact on the predicted tire pressure characteristics of the tire 24. Brake gain can also impact on the coefficient of friction between the runway and the tire 24, which can impact on the predicted tire pressure characteristics of the tire 24.

Another runway condition that may impact on the on the predicted tire pressure characteristics of the tire 24 is a temperature of the runway. For example, ambient heat stored in the runway, e.g. as a result of sunlight heating the runway surface, may be passed to the tire 24 as a result of contact between the tire 24 and the runway. Similarly, the runway surface may provide cooling to the tire 24. This may impact on the predicted tire pressure characteristics of the tire 24.

A further weather condition that may impact on the predicted tire pressure characteristics of the tire 24 is sunlight, for example with direct sunlight on the tire 24 heating the tire carcass and the wheel 16, thereby increasing the gas temperature within the tire 24. This may impact on the predicted tire pressure characteristics of the tire 24.

Another weather condition that may impact on the predicted tire pressure characteristics of the tire 24 is crosswinds experienced by the aircraft 12 during a flight cycle. For example, cross-winds can cause temperature variations in the wheels 16 and the tires 24, including variation between different ones of the wheels 16 and the tires 24. This may impact on the predicted tire pressure characteristics of the tire 24.

By taking into account the runway surface conditions and/or weather conditions within the future time period, the predicted tire pressure characteristics of the tire 24 within the future time period may be obtained with greater accuracy.

In some examples, the fourth data 40 is indicative of a predicted brake wear state of the brake within the future time period. Brake wear state may impact the temperature of the brake 26, for example via brake energy absorption and thermal dissipation, and this may in turn impact on the predicted tire pressure characteristics of the tire 24. For example, a relatively new brake, e.g. a relatively unworn brake may not reach as high a temperature as a relatively old brake, e.g. a relatively worn brake, but the relatively new brake may take longer to cool, which may result in more heat being applied to the gas within the tire 24. Similarly, a relatively old brake may reach a higher temperature than a relatively new brake, but the relatively old brake may cool at a quicker rate, resulting in less heat being applied to the gas within the tire 24. By taking into account the predicted brake wear state of the brake within the future time period, the predicted tire pressure characteristics of the tire 24 within the future time period may be obtained with greater accuracy. In some examples, the predicted brake wear state may be determined based on one or more of brake energy, brake temperature, and brake heating and cooling rate, with use of past, current and predicted values envisaged.

In some examples, the aircraft 12 comprises a brake cooling fan associated with the brake 26, and the fourth data 40 is indicative of a predicted usage of the brake cooling fan associated with the brake 26 within the future time period. Brake cooling fans may enable rapid cooling of the brake 26 by drawing air over the brake 26 in use. Cooling of the brake may have an impact on the temperature of the wheel 16, and hence of the tire 24, which may then impact on the predicted tire pressure characteristics of the tire 24. By taking into account the predicted usage of the brake cooling fan within the future time period, the predicted tire pressure characteristics of the tire 24 within the future time period may be obtained with greater accuracy.

The fourth data 40 can be indicative of a predicted aircraft steering angle during one or more flight cycles within the future time period. For example, steering of the wheel 16 when manoeuvring on a runway can cause friction between the runway and the tire 24. This can generate heat in the tire carcass, which can also cause an increase in gas temperature within the tire 24. This may then impact on the on the predicted tire pressure characteristics of the tire 24. By taking into account the predicted aircraft steering angle, the predicted tire pressure characteristics of the tire 24 within the future time period may be obtained with greater accuracy.

In some examples, the fourth data can be indicative of a predicted ambient temperature of the tire 24, for example a predicted ambient gas temperature within the tire 24, and/or a predicted ambient temperature of the brake 26. A predicted ambient temperature may comprise a temperature to which a particular component will heat/cool to when not in use. It will be appreciated that such ambient component temperatures may be influenced by ambient weather conditions, and that the aircraft 12 may comprise temperature sensors for measuring ambient temperature, and/or that the aircraft may receive information regarding ambient temperature from off-board sources. Ambient conditions may also vary throughout the day, for example with warmer ambient conditions during daytime, and cooler ambient conditions at night, as well as varying throughout a flight cycle of the aircraft, e.g. with wheels 16 experiencing different conditions depending on whether they are extended or retracted through a landing gear bay of the aircraft 12. By taking into account the predicted ambient temperatures, the predicted tire pressure characteristics of the tire 24 within the future time period may be obtained with greater accuracy. In some examples the fourth data 40 may be indicative of predicted flight cycles of the aircraft 12 within the future time period, for example indicative of predicted aircraft operation within future flight cycles within the future time period.

In some examples, the fourth data 40 can be indicative of a predicted wheel temperature of the wheel 16 within the future time period, for example a predicted temperature of a hub of the wheel 16 or the like. Heat from the wheel 16 may be transferred from the wheel 16 to the carcass of the tire 24 and/or the gas within the tire 24, which may impact on the on the predicted tire pressure characteristics of the tire 24. Heating of the wheel 16 may also have an impact on deflection of the carcass of the tire 16 and/or sealing/gas loss of the tire 24. By taking into account the predicted wheel temperature of the wheel 16, the predicted tire pressure characteristics of the tire 24 within the future time period may be obtained with greater accuracy.

The fourth data 40 can be indicative of a predicted weight of the aircraft 12 during one or more flight cycles of the aircraft 12 within the future time period. For example, aircraft weight may impact on loading of the tire 24, which in turn impacts on tire deflection. This may impact heating of the carcass of the tire 24, and hence also gas temperature and pressure within the tire 24. By taking into account the predicted weight of the aircraft 12, the predicted tire pressure characteristics of the tire 24 within the future time period may be obtained with greater accuracy. In some examples the fourth data 40 can comprise a load distribution between two or more tires 24 of the aircraft 12.

Similarly, the fourth data 40 can be indicative of a predicted aircraft centre of gravity during one or more flight cycles within the future time period. As in relation to predicted aircraft weight, the predicted center of gravity may impact on loading of the tire 24, which in turn impacts on tire deflection. This may impact heating of the carcass of the tire 24, and hence also gas temperature and pressure within the tire 24. By taking into account the predicted center of gravity of the aircraft 12, the predicted tire pressure characteristics of the tire 24 within the future time period may be obtained with greater accuracy.

In some examples the fourth data 40 can be indicative of one or more of a predicted aircraft speed during one or more flight cycles within the future time period, a predicted future route of the aircraft 12 within the future time period, a predicted turn-around time of the aircraft 12 between future flight cycles within the future time period, a predicted flight time of one or more flight cycles of the aircraft 12 within the future time period, a predicted ground time of the aircraft 12 within the future time period, a predicted aircraft taxi distance within the future time period, and a predicted number of flight cycles of the aircraft 12 within the future time period. Factors such as speed, ground time and number of flight cycles may impact tire temperature, for example as a result of the impact these factors have on deflection of the tire 24, which may impact on pressure loss of the tire 24.

In some examples, the fourth data 40 can be indicative of a predicted tire carcass temperature of the tire 24 within the future time period. Tire carcass temperature can impact on the predicted tire pressure characteristics of the tire 24 within the future time period. Heat can be generated within a tire carcass in a plurality of ways, including as a result of friction when the tire 24 slides under a heavy load (e.g. slip during braking), as a result of the stress deformation cycle as the tire 24 expands and contracts through tire deflection (e.g. as a result of free rolling and yaw, which may cause lateral forces through the tire 24), and as a result of ambient conditions. The rate at which the tire carcass cools can also be impacted by a plurality of factors, including any of a rolling speed of the wheel 16, ambient conditions, and temperature of a surface with which the tire 24 is in contact. For example, convective heat loss from the tire carcass to internal and external gas may occur, conductive heat loss from the tire carcass to a runway may occur, conductive heat transfer between the tire carcass and the wheel 16 may occur, and radiated heat loss to internal and external gas may occur. In some examples the predicted tire carcass temperature can be inferred based at least in part on any of a temperature of the wheel 16, and a gas temperature within the tire 24.

In some examples, the fourth data 40 can be indicative of any of a predicted gas temperature of the tire 24 within the future time period, and a predicted brake temperature of the brake 26 within the future time period. By taking into account the predicted gas temperature of the tire 24, the predicted tire pressure characteristics of the tire 24 within the future time period may be obtained with greater accuracy.

In some examples, the fourth data 40 can be indicative of a predicted pressure loss of the tire 24 within the future time period. Pressure loss may occur either via leakage through seals and fittings, or through gas diffusion. Pressure loss may be impacted by any of a number of flight cycles within a given time period, gas temperature of the tire 24, tire carcass temperature, and a difference between tire gas pressure and ambient pressure.

In some examples the computing system 14 can obtain fifth data indicative of historical tire condition, and the computing system can determine, based at least in part on the fifth data, the predicted tire pressure characteristics of the tire 24. Data indicative of historical tire condition can comprise any of historical tire re-tread events, historical wheel overhaul, historical tire UV exposure, and tire age. For example, UV exposure may impact deflection of the tire 24 due to its impact on structural properties of the tire 24, and may also affect gas loss from the tire 24. Similarly age of the tire may impact tire deflection, which can in turn impact on temperature of the carcass of the tire 24 and gas temperature within the tire 24, and/or age of the tire can impact on gas loss from the tire 24. By taking into account historical tire condition, the predicted tire pressure characteristics of the tire 24 within the future time period may be obtained with greater accuracy.

In some examples the computing system 14 can obtain sixth data indicative of historical wheel condition, and the computing system 14 can determine, based at least in part on the sixth data, the predicted tire pressure characteristics of the tire 24. For example, the sixth data may be indicative of wheel age. Wheel age may impact on gas loss from within the tire 24, which may in turn impact on the predicted tire pressure characteristics of the tire 24. By taking into account the historical wheel condition within the future time period, the predicted tire pressure characteristics of the tire 24 within the future time period may be obtained with greater accuracy.

Figure 4:
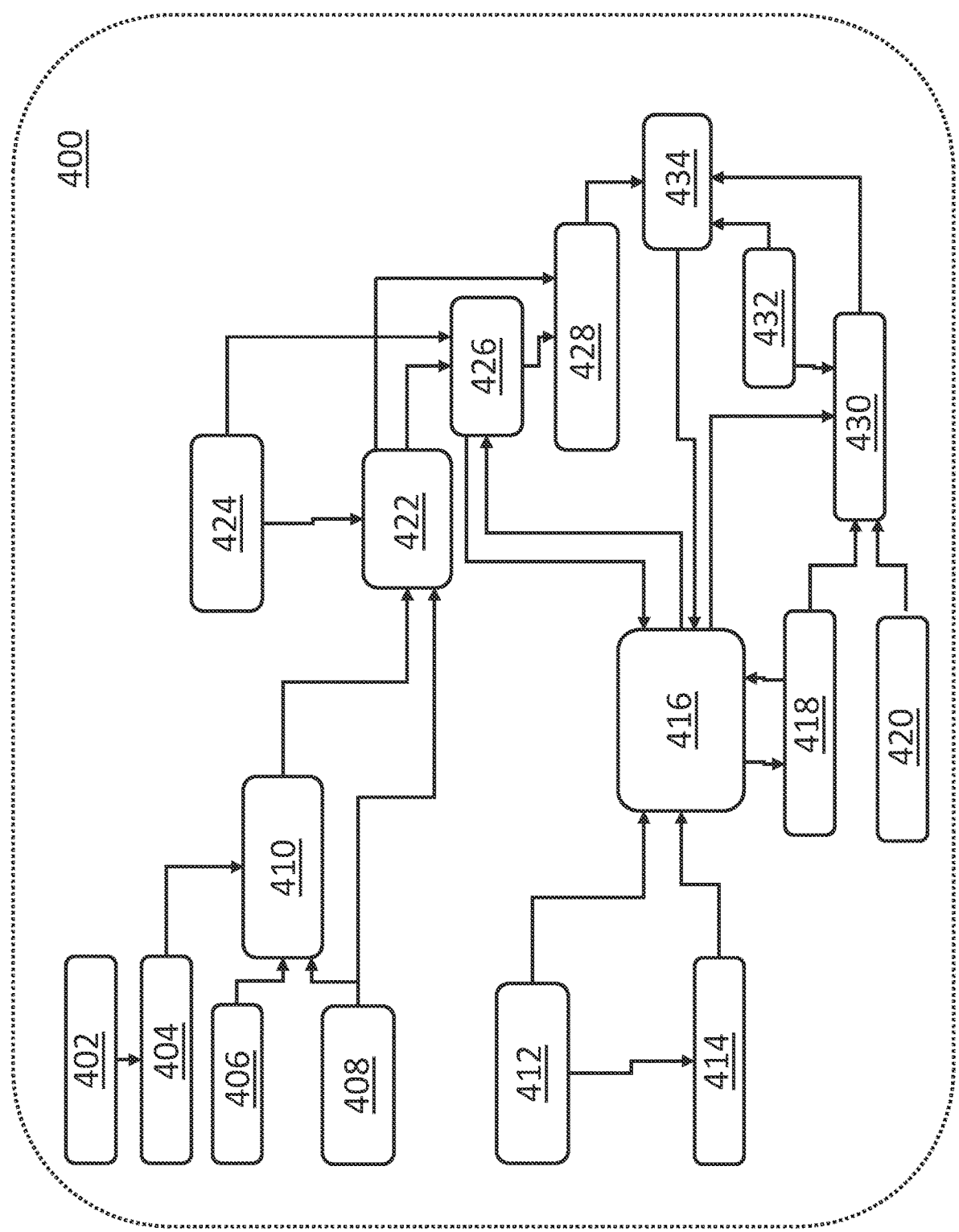
FIG. 4 shows a schematic illustration of a model of the wheel system of FIG. 2.

An illustrative model 400 of the factors described above, and their relationships and connections, is shown schematically in FIG. 4. Such a representation of the wheel system 22, as utilised by the computing system 14, can be thought of as a so-called digital twin of the wheel system 22. The model 400 comprises surface contamination data 402, data relating to friction between tires and a runway 404, brake wear state data 406, brake cooling fan status data 408, brake temperature data 410, aircraft weight and centre of gravity data 412, wheel load sharing data 414, tire rolling and deflection data 416, tire life data 418, wheel life data 420, wheel temperature data 422, ambient temperature data 424, tire carcass temperature data 426, tire gas temperature data 428, tire gas leakage data 430, tire inflation pressure data 432, and tire pressure data 434.

It will be appreciated that the model 400 can be implemented at various levels depending on the data available. For example, brake temperature data 410 may use measured brake temperature where available and predict future brake temperature based on estimated future surface contamination data 402, data relating to friction between tires and a runway 404, brake wear state data 406, and brake cooling fan status data 408.

In some applications, only the future tire pressure is required and this may be determined using combinations of input data without intervening relationships, so that the tire pressure is predicted without requiring formal intermediate models. This may be appropriate for some forms of machine learning algorithms.

It is to noted that the term "or" as used herein is to be interpreted to mean "and/or", unless expressly stated otherwise.

The invention claimed is:

1. A computer-implemented method of predicting tire pressure of a tire of an aircraft, the method comprising:
   obtaining first data indicative of an inflation pressure of the tire;
   obtaining second data indicative of a brake temperature of a brake associated with an aircraft wheel to which the tire is mounted;
   obtaining third data indicative of a gas temperature of the tire;
   obtaining fourth data indicative of one or more predicted operational conditions of the aircraft during a future time period; and
   determining, based at least in part on the first, second, third and fourth data, predicted tire pressure characteristics of the tire during the future time period.

2. The computer-implemented method according to claim 1, wherein the fourth data is indicative of one or more of:
   a predicted future route of the aircraft within the future time period;
   a predicted turn-around time of the aircraft between future flight cycles within the future time period;
   a predicted flight time of one or more flight cycles of the aircraft within the future time period;
   a predicted ground time of the aircraft within the future time period;
   a predicted weight of the aircraft during one or more flight cycles of the aircraft within the future time period;
   a time of day during which the aircraft is predicted to be in-flight and/or on ground within the future time period;
   a predicted aircraft taxi distance within the future time period; and
   a predicted number of flight cycles of the aircraft within the future time period.

3. The computer-implemented method according to claim 1, wherein the fourth data is indicative of one or more of:
   a predicted runway surface condition for one or more runways on which the aircraft is predicted to operate within the future time period; and
   a predicted weather forecast for an ambient environment of the aircraft at predicted geographic locations within the future time period.

4. The computer-implemented method according to claim 1, wherein the fourth data is indicative of one or more of:
   a predicted inflation pressure of the tire within the future time period;

a predicted brake temperature of the brake within the future time period;
a predicted gas temperature of the tire within the future time period;
a predicted tire carcass temperature of the tire within the future time period;
a predicted pressure loss of the tire within the future time period;
a predicted aircraft wheel temperature of the aircraft wheel within the future time period;
a predicted usage of a brake cooling fan associated with the brake within the future time period;
a predicted brake wear state of the brake within the future time period;
a predicted ambient temperature within the future time period;
a predicted aircraft position within the future time period;
a predicted aircraft steering angle during one or more flight cycles within the future time period;
a predicted aircraft speed during one or more flight cycles within the future time period;
a predicted aircraft centre of gravity during one or more flight cycles within the future time period; and
a predicted braking energy of the brake during one or more flight cycles within the future time period.

5. The computer-implemented method according to claim 1, wherein the first data is indicative of one or more of a past inflation pressure of the tire, and a current inflation pressure of the tire.

6. The computer-implemented method according to claim 1, wherein the second data is indicative of one or more of a past brake temperature of the brake and a current brake temperature of the brake.

7. The computer-implemented method according to claim 1, wherein the third data is indicative of one or more of a past gas temperature of the tire and a current gas temperature of the tire.

8. The computer-implemented method according to claim 1, wherein the method comprises determining, based at least in part on the predicted tire pressure characteristics of the tire, a maintenance action to be performed on the tire.

9. The computer-implemented method according to claim 1, wherein the method comprises scheduling, based at least in part on the predicted tire pressure characteristics of the tire, a maintenance action to be performed on the tire.

10. The computer-implemented method according to claim 1, wherein the method comprises updating the predicted tire pressure characteristics based at least in part on actual operational conditions of the aircraft experienced within at least part of the future time period.

11. The computer-implemented method according to claim 1, wherein the future time period is at least 3 days.

12. The computer-implemented method according to claim 1, wherein the method comprises determining, based at least in part on the predicted tire pressure characteristics of the tire, a predicted remaining lifespan of the tire.

13. The computer-implemented method according to claim 1, wherein the method comprises determining, based at least in part on the predicted tire pressure characteristics of the tire, a future inflation pressure for the tire.

14. The computer-implemented method according to claim 1, wherein determining the predicted tire pressure characteristics of the tire during the future time period comprises utilising a model of the tire, and the brake, and one or more relationships between the tire and the brake.

15. The computer-implemented method according to claim 1, wherein determining the predicted tire pressure characteristics of the tire during the future time period comprises utilising a machine learning algorithm.

16. The computer-implemented method according to claim 1, wherein the method comprises obtaining fifth data indicative of historical tire condition, and determining, based at least in part on the first, second, third, fourth, and fifth data, the predicted tire pressure characteristics of the tire.

17. A computing system comprising one or more processors configured to perform the computer-implemented method according to claim 1.

18. The computer-implemented method according to claim 1, further comprising:
automatically generating, based at least in part on the predicted tire pressure characteristics of the tire, a plurality of actions for maintenance of the tire,
wherein the plurality of actions include at least a first action of generating a maintenance action to be performed on the tire and a second action of scheduling when the maintenance action is to be performed for the maintenance of the tire.

19. A non-transitory computer-readable storage medium storing machine readable instructions for use with a computing system for predicting tire pressure of a tire of an aircraft, the computing system including one or more processors, the machine readable instructions comprising instructions that are configured to cause the one or more processors to perform operations comprising:
obtaining first data indicative of an inflation pressure of the tire;
obtaining second data indicative of a brake temperature of a brake associated with an aircraft wheel to which the tire is mounted;
obtaining third data indicative of a gas temperature of the tire;
obtaining fourth data indicative of one or more predicted operational conditions of the aircraft during a future time period; and
determining, based at least in part on the first, second, third and fourth data, predicted tire pressure characteristics of the tire during the future time period.

20. A method of predicting a pressure of a tire, the method comprising:
obtaining historical tire inflation pressure data of the tire;
obtaining historical brake temperature data of a brake configured to provide a braking force to a wheel associated with tire;
obtaining historical gas temperature data of the tire;
obtaining future aircraft operating data; and
determining, based at least in part on the historical tire inflation pressure data, the historical brake temperature data, the historical gas temperature data and the future aircraft operating data, a future tire pressure of the tire.

* * * * *